United States Patent
Hiertz et al.

(10) Patent No.: US 8,400,960 B2
(45) Date of Patent: Mar. 19, 2013

(54) METHOD OF DISTRIBUTIVE RESERVATION OF A MEDIUM IN A RADIO COMMUNICATIONS NETWORK

(75) Inventors: Guido Hiertz, Köln (DE); Begonya Otal, Aachen (DE); Jörg Habetha, Aachen (DE); Francesc Dalmases, Bellaterra-Barcelona (ES); Klaus Peter May, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1029 days.

(21) Appl. No.: 11/568,583

(22) PCT Filed: May 4, 2005

(86) PCT No.: PCT/IB2005/051454
§ 371 (c)(1),
(2), (4) Date: Sep. 15, 2008

(87) PCT Pub. No.: WO2005/109761
PCT Pub. Date: Nov. 17, 2005

(65) Prior Publication Data
US 2009/0010210 A1    Jan. 8, 2009

(30) Foreign Application Priority Data
May 7, 2004   (EP) .................................... 04010894

(51) Int. Cl.
*H04W 4/00*   (2009.01)
(52) U.S. Cl. ......... 370/328; 370/432; 370/338; 370/466
(58) Field of Classification Search .................... None
See application file for complete search history.

(56) References Cited

U.S. PATENT DOCUMENTS 6,754,176 B1 *   6/2004   Gubbi et al. ................. 370/230
(Continued)

FOREIGN PATENT DOCUMENTS

| WO | 03005653 A | 1/2003 |
| WO | 03058881 A2 | 7/2003 |

(Continued)

OTHER PUBLICATIONS

IEEE Man Standards Committee of the IEEE Computer Society: "ANSI/IEEE STD 802.11, 1999, Part 11: Wireless LAN Medium Access Control (MAC) and Physical Layer (PHY) Specifications".

*Primary Examiner* — Bob Phunkulh

(57) ABSTRACT

Method for reservation of a medium in a radio communication network for data transmission between stations (A-E) of the network comprising at least one station (A, B, E) operating according to a first protocol (DRP) and a second station (C, D) operating according to a second protocol (802.11), the method comprises the steps of: providing a contention free period (23) within the first and second protocol; performing the reservation of the medium for the first station (A, B, E) according to the first protocol; and performing the reservation of the medium for the second station (C, D) according to the second protocol, announcing the contention free period for the first and second protocol by use of the same signal (21, 22, 31, 33). In particular a beacon signal is used, wherein the beacon includes a signal (488) which is recognized and accepted by the second stations (C, D). Further information (404) is added into the beacon frame (41) for reserving reservation periods (23) for the first stations (A, B, E).

66 Claims, 4 Drawing Sheets

U.S. PATENT DOCUMENTS

| | | | |
|---|---|---|---|
| 6,937,158 B2 * | 8/2005 | Lansford et al. | 375/133 |
| 7,046,690 B2 * | 5/2006 | Sherman | 370/445 |
| 7,099,671 B2 * | 8/2006 | Liang | 455/450 |
| 7,471,667 B2 | 12/2008 | Hirsch et al. | |
| 7,555,004 B2 * | 6/2009 | Orlik et al. | 370/445 |
| 8,059,607 B1 * | 11/2011 | Shaw et al. | 370/334 |
| 2002/0150095 A1 * | 10/2002 | Sherman | 370/389 |
| 2002/0181426 A1 * | 12/2002 | Sherman | 370/338 |
| 2002/0184389 A1 | 12/2002 | Sherman | |
| 2003/0178984 A1 * | 9/2003 | Lansford et al. | 324/132 |
| 2005/0174964 A1 * | 8/2005 | Orlik et al. | 370/329 |
| 2005/0239474 A9 * | 10/2005 | Liang | 455/454 |
| 2006/0009229 A1 * | 1/2006 | Yuan et al. | 455/452.1 |

FOREIGN PATENT DOCUMENTS

| | | |
|---|---|---|
| WO | 03058887 A | 7/2003 |
| WO | 2004114598 A1 | 12/2004 |

* cited by examiner

METHOD OF DISTRIBUTIVE RESERVATION OF A MEDIUM IN A RADIO COMMUNICATIONS NETWORK

The invention relates to a method of distributive reservation of a medium in a radio communications network comprising a plurality of stations. The stations may also be referred to as terminals, devices, nodes or subscribers, for example.

One kind of a radio communications network is a Wireless Local Area Network based on the IEEE 802.11 protocol (Institute of Electronics and Electrical Engineering). A WLAN may either have a decentralized structure where the stations manage the medium access themselves or a managed structure with at least one active wireless Access Point (AP) which connects the stations for communication together and negotiates when each station can transmit. The AP sends a beacon signal which is broadcasted in the whole WLAN and every station belonging to the network receives the beacon and respects it. The beacon is a signal that is periodically sent by the Access Point in order to enable a further station to get in contact with the AP and to participate in the network controlled by the AP. Therefore a station listens for data on different frequencies before it either becomes a client if it overheard or recognizes a beacon or becomes a decentralized station if it did not hear any contradictory signal. In the decentralized case, the stations send the beacon themselves. Which station is responsible for sending the beacon at the beginning of the superframe is a random process.

For that a beacon is defined as a signal that is overheard and respected by every station within the transmission range of the sender of the beacon (the AP in the infrastructure case). Respecting a beacon comprises copying information such as codes and frequencies used in the cluster. Per definition the receipt of a beacon is not acknowledged by sending an extra frame because otherwise a lot of such acknowledgment frames would in all probability result in a collision while being transmitted on the medium.

In the IEEE 802.11 standard an on demand mechanism exists for the medium access in order to reduce collision times. This on demand mechanism is based on a Request-to-Send (RTS), Clear-to-Send (CTS), Data and Acknowledgement (ACK) sequence. The control frames RTS and CTS comprise various fields or information elements (IEs) for different types of information. For example, one field or IE comprises information concerning the destination of this signal. Another field or IE concerns the duration of the RTS-CTS, DATA and ACK exchange. As every station that overhears a control signal like RTS or CTS has to receive and interpret it, the duration of the RTS-CTS, DATA and ACK exchange is known by both the stations in the transmission range of the transmitting station and the stations in the transmission range of the destination station. Therefore those stations are able to respect the ongoing transmission and defer from transmitting during the announced duration.

The IEEE 802.11 technique has been put into practice and is installed in a lot of Consumer Electronic (CE) devices.

The RTS and CTS packets are shorter than most DATA packets. Therefore a collision of these packets with transmissions of other stations results in a shorter blockage of the medium. However, collisions between RTS and CTS packets of different stations can still occur. The patent application WO 2004/114598 A1 discloses an additional reservation IE in the RTS and CTS (or DATA and ACK packets). The reservation refers to the next planned transmission, for which a certain time period in the future is reserved. This new mechanism can avoid collisions to a great extend.

The solution for announcing reservations in WO 2004/114598 A1 is not fully backwards compatible with IEEE 802.11. The reason is that so-called "legacy" stations conforming to the standard will not be able to understand the reservation information in RTS, CTS, DATA or ACK packets. However, any new mechanism for a distributive reservation of the medium in a WLAN radio network should be downward compatible to the IEEE 802.11 protocol. Downward compatibility in this case means that reservation requests performed by the stations, which use the new protocol, have to be performed in such a way that legacy stations of the "old" 802.11 protocol are able to understand them. Only in this case the transmission between stations using the new protocol would not be interfered by legacy stations using the 802.11 protocol. A new protocol that is downward compatible would achieve, that devices or stations performing the new protocol share the medium with legacy devices or stations performing the 802.11 protocol.

Therefore it is an object of the invention to provide a method of distributive reservation of a medium in a radio network, especially in a WLAN according to the IEEE 802.11 standard. It is a further object to provide a radio communications network, which consists of both stations that use the 802.11 protocol and stations that use a protocol that is downward compatible to the 802.11 protocol.

With regard to the method the object is solved by a method as defined in independent claim 1, with regard to the radio communications network the object is solved by a network as defined in independent claim 16.

The solution as given in the independent claims 1 and 16 will be explained in the context of a distributed reservation protocol DRP. This first protocol is used by the first stations. The second stations do not understand the first protocol. They use a second protocol, which is exemplary the IEEE 802.11 standard. However it the invention is not limited to this example.

For example, the IEEE 802.11 protocol foresees that a beacon signal which is overheard by a station has to be respected by that station as the beacon signal usually is broadcasted by an Access Point AP. This means by a station that acts as a master in a managed network. The stations other than the AP in the network or cluster are clients. Usually the beacon is sent by a master and is repeated periodically such that a device that intends to become a station of the network built around the AP can overhear or understand it within a certain period while sensing. In a WLAN the stations are typically arranged in such a way that the destination station is within the transmission range of the source station. That is why fundamentally there is not a need for an Access Point. But, the invention builds on the fact that a beacon signal reaches all active stations that may themselves intend to start a future transmission on the medium and that the beacon signal has to be decoded by all these stations.

The invention is based on allowing for establishing a reservation any station that is a sender or a receiver of a future transmission to broadcast a beacon signal. According to the present invention, the so-called Contention Free Period (CFP), which is signaled in or as part of a beacon signal, will be used by sender or receiver of the future transmission to reserve a certain period of time for the planned transmission. In contrast to any new field or information element, the CFP information is part of the IEEE 802.11 standard and as such understood by all legacy or second stations operating according to the second protocol. The CFP information defines a period of time, during which no other station than the sender of the beacon is allowed to access the medium. Even though the purpose of the CFP information according to the IEEE 802.11 standard is to grant the AP control over the medium, it is possible to use the CFP information for reservation purposes in the way described in this invention. Optionally, additional information can be transmitted in new fields or information elements of the beacon signal. Such information may further comprise frequency or code channel of the future transmission or information regarding the sleep phases of the transmitting station. As every first and second station that overhears a beacon signal has to receive and interpret it, stations in the transmission range of the transmitting station and the stations in the transmission range of the destination station are aware of the reserved period in time. Legacy or second stations will interpret this time as reserved for an AP, and first stations that understand the new or first protocol will interpret it as reservation for a planned transmission. Both types of stations will respect the reservation and will defer from transmitting on their own during the announced CFP.

The beacon comprising the reservation request is broadcasted in the network and thus it is ensured that a determined CFP will be respected by the active first and second stations.

In order to avoid a hidden node or hidden station problem according to a preferred embodiment the source station may send a first, so called source beacon. As the source beacon is broadcasted other active stations in the transmission range of the source station overhear it and respect the content. This results in a CFP. The station, which is intended as the receiver of the planned transmission, will recognize its address in a special DESTINATION field in the source beacon. Then, only the destination station (not the other active stations) acknowledges the save receipt of the source beacon by sending a destination beacon which again is overheard by all active stations within the transmission range of the destination station. The transmission ranges of both the source station and the destination station may be not congruent.

Another variant is the case of a polling feature where the future receiver of data that are to be transmitted is the destination station that sends a destination beacon to the source station in order to initiate the connection. Then the source station which will later on be the sender of the data acknowledges the receipt of the destination beacon by sending a source beacon.

According to yet another variant wherein a connection between the source station and the destination station has already been set up and a data frame exchange already occurs the source station sends as part of the data frame of the present transmission a reservation request for a future transmission to the present and intended destination station. A second station using the 802.11 or second protocol might not expect a reservation request as part of a data frame and thus will neither be able to understand nor respect it. Besides, an 802.11 station will not overhear a data frame whose header does not comprise the station's address. That is why the destination station will acknowledge the receipt of the reservation request by broadcasting a beacon which comprises a copy of the reservation information. Active stations in the transmission range of the intended destination source overhear the beacon as it is a kind of frame that is addressed to every active station. They will then store locally the reservation information. The source station receives the beacon and interprets it as an acknowledgment of save receipt of the reservation information which it sent as part of the data frame.

According to another variant wherein a connection between the source station and the destination station has already been set up as explained before, the destination station may acknowledge the receipt of the reservation by a beacon frame. However this beacon frame may announce the very next wireless medium reservation the destination is aware of. Thus the destination station may not repeat the current received reservation information but inform its neighbouring stations about the very next planed transmission.

Other active stations in the transmission range overhear the destination and/or the source beacon and respect them, this means that they will not compete for medium access during the reserved period.

Stations which received the source and/or destination beacon may in an additional step send an own beacon, in which the Contention Free Period, respectively reservation request from source or destination beacon is included.

Other active stations then the destination or the source station which received any reservation request in any beacon store the information concerning the CFP, respectively the reservation request and defer from accessing the medium during the reserved Contention Free Period.

In order to avoid a problem with hidden nodes or hidden stations the source station may repeat or re-send the reservation request that was already transmitted as part of a data frame this time as part of a beacon which is broadcasted within the transmission range of the source station. Active stations other than the intended destination station overhear the beacon, locally store the reservation information and defer from medium access during the reserved period.

In order to further improve the hidden node protection, according to another embodiment the reservation information is not only included in the beacons of sender and receiver(s) of the planned transmission but also in the beacons of other neighbouring stations of sender and receiver, which receive the reservation information in the sender and receiver(s) beacons. This embodiment refers to the alternative where the source station initiates the reservation by sending a first, so called source beacon and to the alternative where the source station sends a reservation request for a future transmission as part of the data frame of an ongoing transmission. Then, not only the destination station but all other neighbouring stations acknowledge the save receipt of the source beacon by sending a neighbour beacon which again is overheard by all active stations within the transmission range of the sender of the neighbour beacon.

Other active stations in the transmission range overhear the beacons and respect them, this means that they will not compete for medium access during the reserved period.

Note that source beacon, destination beacon and neighbour beacon are just names to distinguish the roles of the stations in the establishment of a reservation but that the beacons do not necessarily have a different content. One beacon may comprise several reservations, not only the own but also reservations from neighbouring stations. However, the destination beacon may be used by the receiving station to indicate changes of future reservations to the transmitter. Thus a feedback regarding the reservation table at the receiver side is given to the transmitter.

According to a preferred embodiment a passive station is a station that is in the area of the network but not actively listening. A passive station that intends to become active first listens on the medium, probably on different frequencies, for a beacon. A source, destination or neighbour beacon according to the invention will be respected by the station that just became active and interpreted as not deriving from an Access Point.

This interpretation might be alternatively because the source or destination beacon is not repeated periodically as a AP beacon is or because one of its fields or elements indicates it.

Legacy IEEE 802.11 stations that do not support the new protocol of this invention might interpret the beacon as deriving from an Access Point. These legacy stations might not be able to understand the new fields of the beacon, but they will in any case respect the CFP and thereby the reservation.

For the initiation of a new station a period for listening on the medium might be prescribed which is long enough to ensure that the new station is aware of the current traffic.

According to one variant the beacon or beacon signal is a frame that consists of several fields and a Frame Control field and/or Frame Body field comprising the reservation information.

It is an advantage that the beacon which includes the Contention Free Period is according to the IEEE 802.11 and extension standards to cover a large amount of existing devices.

The beacon may comprise information regarding the priority of the planned transmission which is announced and also stored in all active devices and compared with older priority information.

If the beacon comprises information regarding the frequency or code channel of the planned transmission other stations only have to defer from accessing this part of the medium.

According to one embodiment the beacon comprises information regarding the starting point and duration of the reservation. According to another the beacon comprises a bitmap, which signals the occupancy of time slots within a superframe-like time period and in which one or several bits are included per time slot.

The beacon may further comprise information regarding the times during which the sender of the beacon will be in sleep or active or hibernating mode. The sleep or active times may be announced with their starting time, duration and eventually periodicity. Alternatively, the sleep or active times are announced in form of a bitmap, where one or several bits signal the state of the station in a certain time slot.

The beacon may comprise information regarding the times during which neighbouring stations will be in sleep or active or hibernating mode.

The inventive radio communications network includes a plurality of stations, wherein at least two stations use a protocol that prescribes that a beacon signal, which is overheard, has to be respected, and wherein at least a single station announces a Contention Free Period as a means for reserving a future transmission, by broadcasting a beacon that comprises the Contention Free Period (CFP). As mentioned above a beacon is a signal that is respected by every active station.

According to a preferred embodiment the source station sends a beacon with a reservation request for a future transmission and a single or several destination stations in the transmission range of the source station acknowledge the receipt of the source beacon by sending a destination beacon. This is a situation when the connection first has to be connected.

According to another embodiment future destination station sends a destination beacon to the future source station which is supposed to send data and the future source station acknowledges the receipt of the destination beacon by sending a source beacon.

This corresponds to a situation in the network where a station that is a future receiver of data initiates the connection as it polls another station.

If in a radio communications network a connection between source station and a single or several destination station(s) has already been set up the source station may send as part of a data frame of a present transmission a reservation request for a future transmission to the present and intended destination station;

the destination station may send a beacon repeating the reservation request and announcing a Contention Free Period;

active stations in the transmission range of the intended destination station may overhear the beacon and store the Contention Free Period, respectively reservation information locally and the source station may interpret the beacon as an acknowledgement of save receipt of the data frame just sent.

In this case the source station may repeat the beacon and active stations other than the intended destination station overhearing the beacon, locally store the Contention Free Period, respectively reservation information and defer from medium access during the reserved period. This results in a better avoidance of hidden stations.

Active stations both in the transmission range of the source station and/or in the transmission range of the destination station overhear the source and/or destination beacon and respect the CFP, respectively reservation information in the beacon. This means they will defer from medium access.

According to yet another variant stations, which received the source and/or destination beacon, send an own beacon, in which the Contention Free Period, respectively reservation request from source or destination beacon is included.

Stations other than the source or the destination, which receive any reservation request in any beacon store the information concerning the Contention Free Period, respectively reservation request and defer from accessing the medium during the reserved period (CFP). This behaviour ensures that during the announced CFP only those stations access the medium that negotiated there upon.

A passive station that becomes active first listens for a beacon on the medium before sending a beacon on its own in order to be aware of the medium's traffic. The station might listen on the medium for a determined period.

According to one variant of the radio communications network the beacon or beacon signal is a frame that consists of several fields such as a Frame Control field and/or a Frame Body field that comprises the reservation request.

According to a most preferred embodiment the beacon comprising the Contention Free Period is according to the IEEE 802.11 and extension standards as a lot of consumer electronics devices with that standard are sold and are used.

The beacon may comprise information regarding the priority of the planned transmission. As different degrees of priority exist, the sequence of processing the ahead lying data transmissions may change with every new overheard beacon.

The beacon may comprise information regarding the frequency or code channel of the planned transmission. In this case the other active station may compete for a medium access during the CFP to a frequency or code channel different from the reserved ones.

The beacon may further comprise information regarding the starting point and duration of the reservation.

The beacon may also comprises a bitmap, which signals the occupancy of time slots within a superframe-like time period and in which one or several bits are included per time slot.

The beacon may additionally comprise information regarding the times during which the sender of the beacon will be in sleep or active or hibernating mode thus enabling a better utilisation ratio as other active station know its behaviour in advance. The sleep or active times may be announced with their starting time, duration and eventually periodicity. Additionally the sleep or active times may be announced in form of a bitmap, where one or several bits signal the state of the station in a certain time slot.

The beacon may comprise information regarding the times during which neighbouring stations will be in sleep or active or hibernating mode thus avoiding collisions as the active stations have knowledge of the states of several of the other stations.

The inventive method may preferably be used in a WLAN according to the IEEE 802.11 protocol. However the inventive method may be used in other communication networks as well which use a common medium that has to be shared among all participating stations.

The invention also relates to a computer program or an implementation of a computer program in hardware that is run down by a processor and that comprises instructions for the implementation of the above mentioned method.

The invention will be further explained in detail with reference to the accompanying drawings, wherein FIG. 1 shows an example of several stations sharing a medium;

Figure 1:
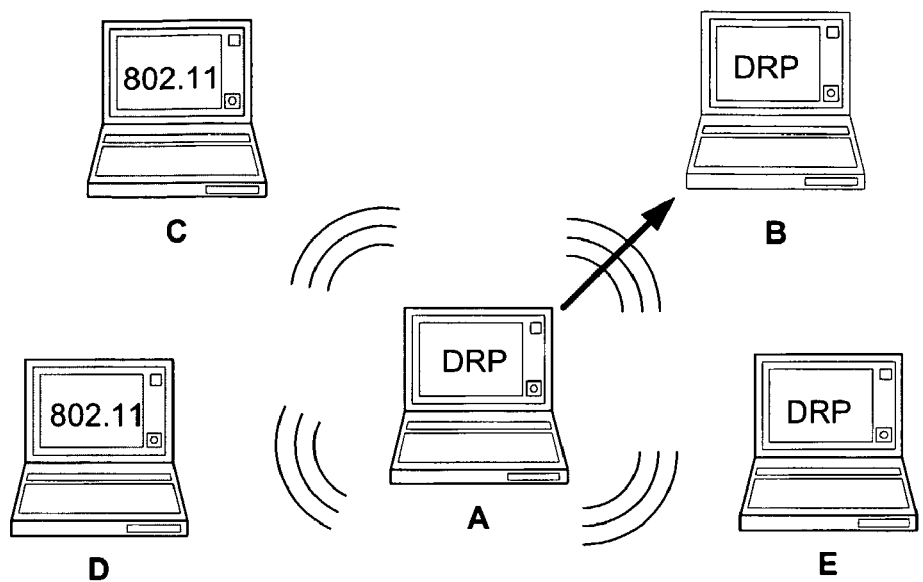

FIG. 1 shows an example of several stations A-E sharing a medium. The stations A, B and E operate according to the DRP protocol. The stations C and D represent so called legacy stations, which do not understand the DRP protocol and the content of a beacon according to the DRP protocol. The network in this example consists of a station A that is supposed to send to a B. The act of sending is indicated as an arrow. In the transmission range of source station A are the active stations C and D which use a different or old protocol than station A does. The transmission range is indicated by circular segments. However the stations C and D recognize CFP signals, which are included in the beacon.

Figure 2:
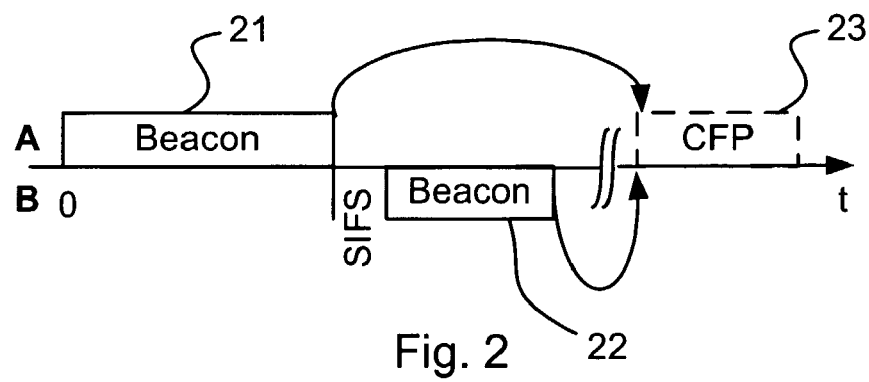
FIG. 2 shows a time diagram of a frame exchange between a station A and a station B according to a first alternative.

FIG. 2 shows a time diagram of a frame exchange between a station A and a station B according to a first alternative wherein station A initiates a connection with station B by sending a source beacon 21. Station B returns a destination beacon 22 after a Short Interframe Space (SIFS). SIFS gives the receiver time to turnaround its transceiver from receiving to transmitting state. It is the shortest duration between consecutive frames. Hence, the frame exchange is uninterruptible. Both beacons 21, 22 comprise reservation information hinting on the same reservation period CFP. The frame 23 drawn with a dashed line illustrates the reserved period 23, i.e. the announced contention free period. The beacons 21, 22 containing the reservation will be understand by the stations A, B, E due to the same DRP protocol. The legacy stations C, D will understand the announced CFP period according to the 802.11 protocol, since the 802.11 protocols specifies that each station operating according to the 802.11 protocol has to accept CFP periods, which are signaled normally by an Access point AP. However within this invention this functionality is misused by the DRP stations A, B and E, which incorporating a CFP signaling within a beacon for signaling a reservation for both kinds of stations, the DRP stations and the legacy station. The legacy stations do not know that the signaled CFP period does not come from an AP, wherein the source of the CFP signaling is not important. The important feature is that the legacy stations C, D are urged to be quiet within the signaled CFP period in that way.

Figure 3:
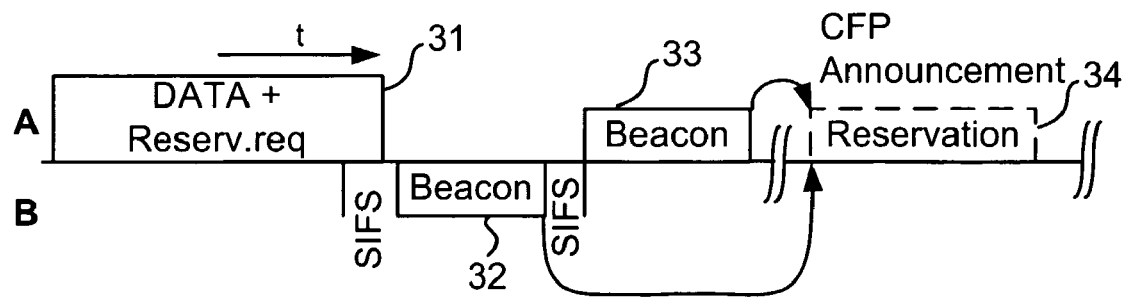
FIG. 3 shows a time diagram of a frame exchange between a station A and a station B according to a second alternative.

FIG. 3 shows a time diagram of a frame exchange between a station A and a station B according to a second alternative wherein a consecutive transmission occurs between A and B and the reservation request is part of a data frame 31. In this case the present and intended destination station B is the first to send a beacon 32. The source station A repeats this beacon 33 to prevent hidden stations. The repeated reservation information by sending the beacon 33 is redundant for the destination station B, but is necessary for active stations, e.g. stations C, D in the transmission range of station A which do not understand the reservation request in the data frame 31 as they do not know the DRP protocol of this invention and which are not in the transmission range of station B. The frame 34 drawn with a dashed line illustrates the reserved period, i.e. the announced contention free period, which is provided for undisturbed transmission of data between station A and B.

Figure 4:
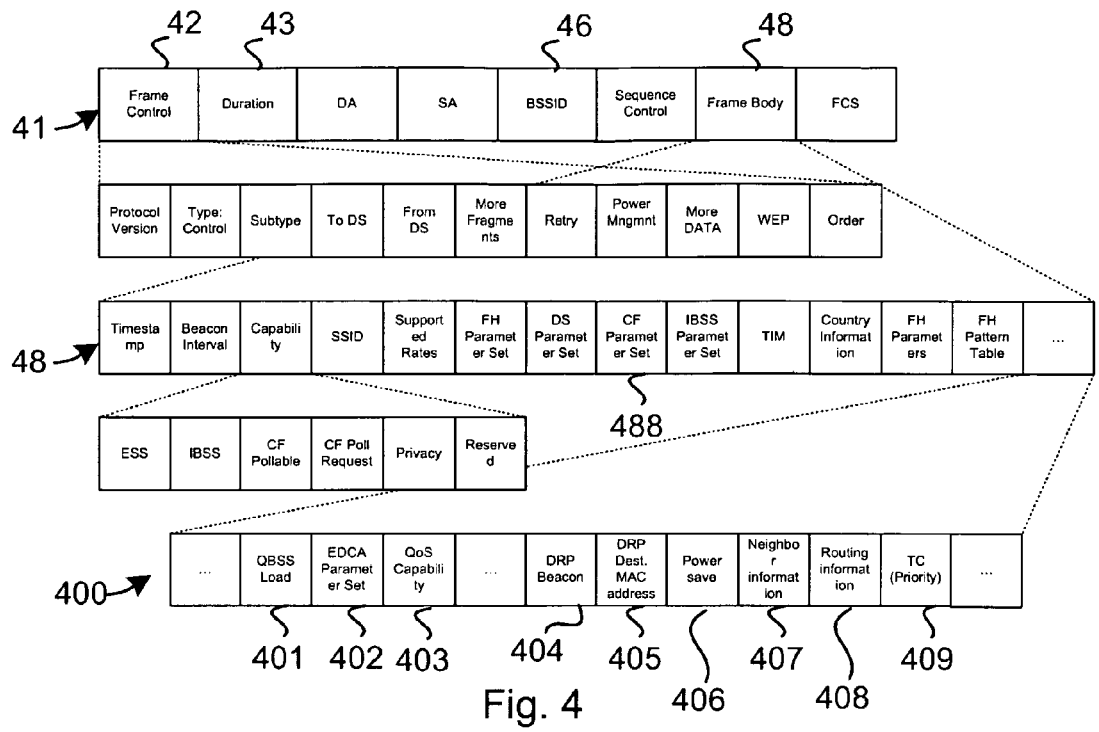
FIG. 4 shows an example of a beacon comprising a reservation request.

FIG. 4 shows a standard IEEE 802.11 beacon frame 41 which is enhanced by additional DRP information elements 400. The standard 802.11 beacon elements which comprise all further elements except the elements 400 is used to indicate a CFP to legacy stations C, D. Additional DRP information elements 400 are used to signal further information to neighboring DRP stations A, B and E. Further on information elements 403 as proposed in the amendment 802.11e are used to indicate QoS parameters of the planned transmission.

The beacon frame 41 comprises the signaling of the CFP, e.g. in the CF parameter set 488 and a DRP reservation request. The reservation request according to the DRP protocol is mainly included in the DRP beacon element 404. The beacon frame 41 includes several fields or Information Elements. The DRP reservation request beside the CFP information 488 may be included in the Frame Control field 42 and/or in the Frame Body 48. The reservation information for the DRP reservation request may include some of the following fields or Information Elements:

period of the traffic 404
duration on the medium reservation 43
priority of data transmission 409
number of future reservation periods 404
bitmap 404 indicating segments of time during a superframe that are reserved by the sender of the beacon or any other station.

The period of the traffic is stored in the DRP beacon element 404. By this period of the traffic information other stations are informed when the next frame will be transmitted. The duration field 43 within the beacon frame 41 informs other stations about the duration of the next data transmission of this stream, including time for the acknowledgement message. The priority field 409 includes information about the traffic category this stream belongs to, e.g audio, video, real time, non-realtime data etc. By designating the priority of the future transmission, it is possible to support different Quality of Service levels in the network. In case two transmissions are planned for the same time period, the higher priority traffic will gain the medium access and the lower priority sending station will automatically withdraw or delay its reservation.

An optional information field included in the DRP beacon field 404 informs other stations about the number of future reservation periods to be made. This allows a station to make a periodic reservation by a single reservation request sent within only one beacon instead sending each time a beacon a reservation is needed. The period between two transmissions is given by the "period of traffic" stored in field 404 and the constant duration of each transmission in the "duration of the medium reservation" field 43.

A bitmap 72 included also stored in the DRP beacon field 404 is an alternative to signaling the reservation by giving a starting time and duration of the reserved period. For this purpose the time is divided into superframes 60, wherein each superframe 60 is divided into time slots 73. An alternative for using time slots within the whole superframe is to use time slots only in the signaled contention free period. A slotted superframe is illustrated in more detail in FIG. 7a. One or several bits of the bitmap 72 indicate for each time slot of the superframe 60, whether this time slot 73 is reserved or not.

Figure 5:
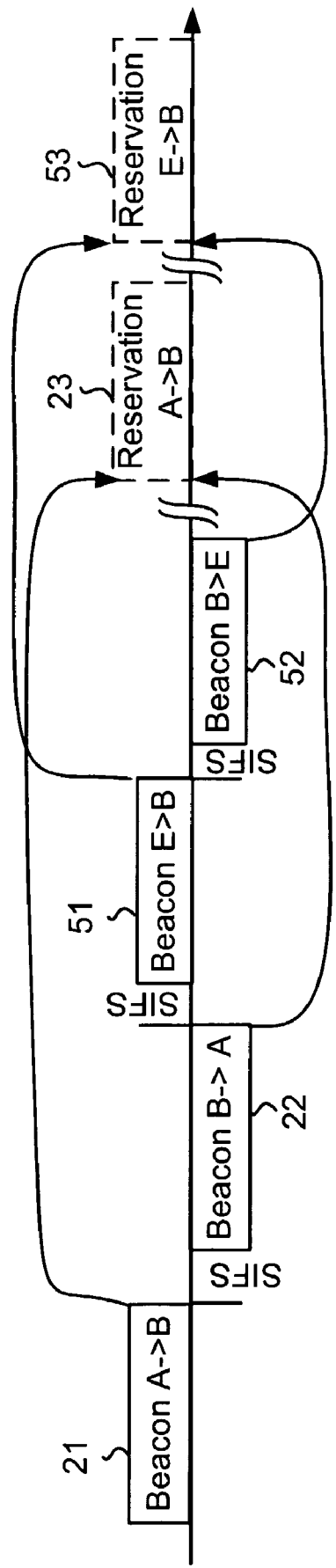
FIG. 5 shows a time diagram of a frame exchange between a station A and a station B as well as between a station E and station B according to a third alternative.

FIG. 5 shows a time diagram of a frame exchange between a station A and a station B as well as between a station E and station B according to a third alternative. Between the period for the beacon exchange of source station A and destination station B and the reserved period 23 in this example the medium can be used for a period of beacon exchange between a station E and station B. Nevertheless, the reserved period 53 for data transmission between station E and B occurs later than the one between station A and B.

The proposed solution foresees a beacon frame 41 as shown in FIG. 4 is enhanced by additional information elements 400. These elements 400 may be used to give further information about QoS requirements or QoS traffic waiting in the station. Further elements 406 signal information regarding the power save mode of the stations. Regarding DRP reservation there are elements 407 which signal neighboring reservations to improve the distributed calculation of an optimized reservation scheduling. Further on there are elements 405 which signal the MAC addresses to the intended communication partner. This provides the possibility to know the communication partner. Further it is possible to recognize a reserved period as being free for a station if a station having a MAC address outside the transmission range has reserved a reservation period. If the station which has reserved a reservation period is outside the transmission range the reservation period could be used otherwise. The BSSID field 46 in the beacon could be set to the MAC address of the device, which is sending or receiving the beacon. For legacy devices C, D it will therefore seem as if the beacon comes from a foreign Basic service set BSS or AP. An alternative is to define one or several MAC addresses as DRP addresses.

With the optional QBSS load information element 401 an AP or a station in case of a decentralized system can announce its current traffic load, which can be used by the stations to decide whether to associate with the AP or not. The QBSS load element 401 contains the fields "frame loss rate", "channel utilization" and "station count". The "frame loss rate" can e.g. be used by DRP to announce the success rate of the station's reservation attempts in the past. The "channel utilization" could e.g. be set to the maximum value in order to prevent legacy 802.11e stations from trying to associate with a DRP station as the legacy station will assume that the DRP station is an AP. Alternatively, the "channel utilization" field could be used by DRP to distribute queue lengths of the stations. The "station count" could e.g. be used by DRP to announce how many other stations it can hear.

The EDCA parameter set 402 could be used to signal traffic category information regarding the planned transmission. However in the conventional 802.11 protocol, this information element is quite big. It is more efficient to define a new EDCA information element 402 for DRP transmissions, which contains only the traffic category of the planned transmission.

In order to reduce the overhead of the DRP protocol, an embodiment is described, which reduces the number of beacon frames that have to be sent. The idea is that not all the stations are announcing reservations in beacons. In the prior art, a beacon includes the reservation of the station, which is sending the beacon, and eventually the reservations of 1-hop neighbors of that station.

However, one problem is that the neighbor information cannot be signaled as CFP, because only one CFP can be signaled per beacon. This is why the neighbor reservation will only be understood by first stations operating according to the DRP protocol and not by legacy stations, unless a separate beacon is sent for each neighbor reservation, which would create a lot of overhead. The same applies to different reservations of the same station. Only a single reservation period could be protected from being disturbed by legacy stations, unless several beacons are sent.

This is why it is foreseen in a preferred embodiment that several reservations are protected by a single beacon, respectively a Contention Free Period (CFP). For this purpose several reservations are grouped into a contiguous DRP period 62, which is protected by a CFP. The beacon frame 41 comprises a CF parameter set 488 for covering the DRP period 62. During that DRP period time the legacy stations are blocked, since they received the CFP signal incorporated within the beacon frame 41. During the DRP period time the first stations A, B and E according the DRP protocol can exchange their reservations. In the extreme case, there is just one big DRP period 62 per superframe 60, as illustrated in FIG. 6.

Figure 6:
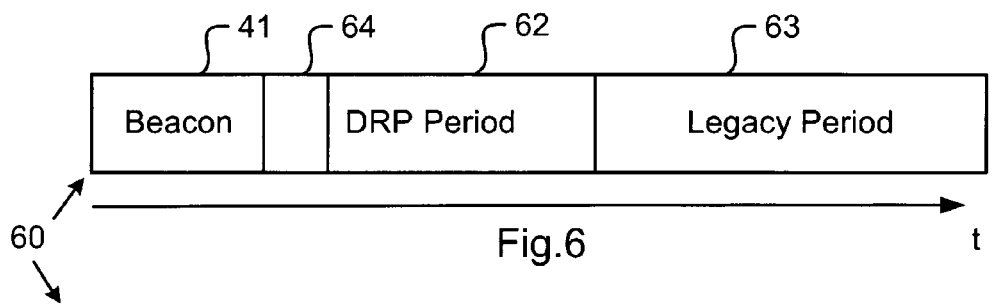
FIG. 6 shows a structure of a superframe according to the present invention.

FIG. 6 represents a superframe 60 starting with a beacon frame 41. The beacon frame 41 announces upcoming Contention Free Periods for blocking the legacy stations C, D. Further first stations according to the DRP protocol are informed of upcoming reservation periods. In 802.11 protocol no other device than the AP is allowed to initiate transmission during the CFP. Hence, the CFP may be used for DRP transmission save from legacy station interference.

Each DRP period 62 can be protected by a single beacon frame 41 from a single first station or by beacons from different stations. In case of a single beacon, the beacon frame 41 could e.g. be sent by the station in the station, which is anyway sending the beacon frame 41 in this superframe 60. In order to protect the one or more DRP periods 62 from hidden legacy stations C, D, those DRP stations that are hearing a (hidden) legacy station should also announce the DRP period (s) in a beacon.

Figure 7A:
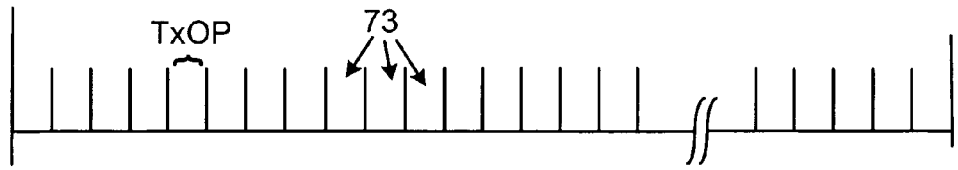
FIG. 7a shows a structure of a slotted superframe according to the present invention.
Figure 7B:
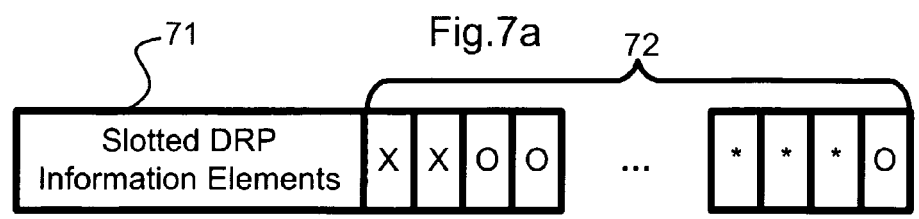
FIG. 7b shows a bitmap inside a slotted DRP information element according to the present invention.

Inside the DRP period 62 a slotted or non-slotted frame structure could be employed as illustrated in FIG. 7b. The DRP period 62 could begin with a beacon period 64, in which all DRP stations announce their reservations. So all DRP station could send a beacon frame to or a predetermined number of DRP stations send their beacon frames to signal their own reservation periods. Further the received reservation periods from neighboring stations may be transmitted also. The grouping of transmission of beacon frames increases the signaling effort, since the time for sending payload data is not interrupted by broadcasting beacon frames.

Alternatively, the DRP stations could make their reservations piggyback to DATA and ACK and/or RTS and CTS packets. It would not be required that legacy stations understand this piggybacked reservation information, as the whole DRP period is protected by one or several beacons.

In another embodiment of the invention a CTS-to-self (clear to send) signal is used instead of a beacon to announce a DRP reservation period within the protected DRP period 62.

Signaling overhead in DRP controlled networks can be high, leading to decreased efficiency. To reduce the overhead, a slotted DRP structure is proposed, see FIGS. 7a, 7b.

FIG. 7a illustrates a superframe which is divided into a number of subsequent Transmission Opportunities TxOP. The number of TxOPs per superframe 60 is known to all DRP stations A, B, E in the Basic Service Set.

The slotted structure as shown in FIG. 7a allows a DRP station to indicate to neighboring stations by a simple bitmap 72, which TxOPs it reserves. As the slotted DRP may include unused channel reservation, each DRP station is allowed to access the medium using a contention based access protocol like the IEEE 802.11e EDCA after a certain idle period, which marks the rest of the reserved TxOP duration as unused, e.g. by a predetermined code.

FIG. 7b shows a bitmap 72 inside the Slotted DRP information element 404 indicating the availability of TxOPs as seen by each DRP station. The bitmap 72 indicates via the slotted DRP mechanism, which time slots 73 are reserved or not. Further more a DRP station shall indicate which TxOPs are reserved due to frame reception or own frame transmissions. Furthermore, a DRP station indicates the status of TxOPs, which are already in use by surrounding DRP stations. So by marking the positions in the bitmap with different codes (X, O, *) it is indicated whether the slot is not used or reserved by the station itself, by the neighboring station or by an unknown station. If a time slot is not used it can be signaled to other stations that this slot is not used at the moment. However the used time slots may be signaled to other first stations also to reduce the signaling effort.

By signaling a Contention Free Period signal in the beacon frame a time period is provided as a kind of container in which one or several first stations can communicate according to a distributed reservation protocol.

It could be advantageously that the time inside the Contention Free Period is either slotted or non-slotted.

During the DRP period 62, the first stations A, B and E distribute their reservations piggyback to DATA, ACK, RTS or CTS packets.

It is further possible that, beacon frames are sent instead of ACK frames by the first stations inside and outside the Contention Free Period, wherein the Contention Free Period is announced within the beacon frame. The beacon frames are interpreted as acknowledgement of the DATA packets to which the ACK would have referred.

So the sending of ACK signals is reduced. In case that a beacon frame is sent instead of an acknowledge signal ACK the beacon comprises information needed for the acknowledgment protocol.

Inside the DRP period 62, the first stations distribute their reservations period inside beacons, which can be grouped into a beacon period 64.

It is further possible that only specific stations, e.g. stations having predetermined characteristic announce the Contention Free Period for the distributed reservation protocol. So it could be controlled that station having a strong signaling distribute the CFP. It is further possible that only stations, which do not use extended stand-by times distribute the CFP for both kind of stations by sending the beacon frame according to present invention. Stations like PDAs, mobile phones etc have a small battery life time or power capacity, so they are mostly in a passive mode.

The beacon frame is transmitted at the beginning of the superframe for announcing the Contention Free Period for the distributed reservation protocol.

It is further possible that stations, which are hearing frames from legacy stations, do also transmit a beacon with a Contention Free Period that is identical to the Contention Free Period announced in said beacon at the beginning of the superframe. By this it guaranteed that each legacy stations will be quiet within the DRP period 62. It may advantageously that among those stations, that are hearing frames from legacy stations, only those stations, which are aware that at least one of said legacy stations are hidden to other stations, transmit a beacon with a Contention Free Period, that is identical to the Contention Free Period announced in said beacon at the beginning of the superframe. So the signaling effort is optimized.

To further secure that no backing off due to a congestion of data on the medium occurs it is foreseen that before using a reserved time period for data transmission the station, which requested the reservation listens to the medium for a fixed duration at the beginning of the reserved time period before starting the transmission.

The beacon frame may further include a station count field inside the QBSS load information element 401, which is set to the number of stations that the sender of the beacon frame is hearing. So the station is aware how many stations exist in their transmission range. Further the beacon may comprise a list of neighbors that the sender of the beacon can hear.

By adding routing information 408 into the beacon frame 41 information may be transmitted which route is a preferred in order to establish and maintain multihop routes in the network instead of using the shortest route having the smallest number of hops. The shortest route may include stations having a high traffic load.

The beacon may further be used for link adaptation and respectively rate selection purposes. Since a beacon is sent by use of low data rate the receiving station may measure the quality of the received signal to determine which data rate should be used for transmission of data.

If no legacy stations are within the transmission a dedicated broadcast management frames may be used instead of beacons to announce reservations. Before using the broadcast management frames the existence of legacy stations should be checked. Otherwise the legacy station will disturb the data transmission since they do not understand the broadcast management frames. The dedicated management frames are a DRP Request sent by the sender of the planned transmission and a DRP Response send by the receiver of the planned transmission. The handshake of DRP Response and DRP Request is completed with a DRP Complete message sent by the sender of planned transmission.

In a last embodiment new management frames are defined in order to announce reservations. These management frames could e.g. be called "DRP Request", "DRP Response" and optionally a "DRP Confirm". These management frames are an alternative to using legacy 802.11 beacons, but have the disadvantage of not being understood by legacy 802.11 stations.

As mentioned above a CTS frame is used instead of a beacon to protect the time period for the distributed reservation protocol from interference with legacy stations. This CTS signal is sent without sending a RTS frame before. Since the stations accept the CTS signal they will not interfere.

Figure 8:
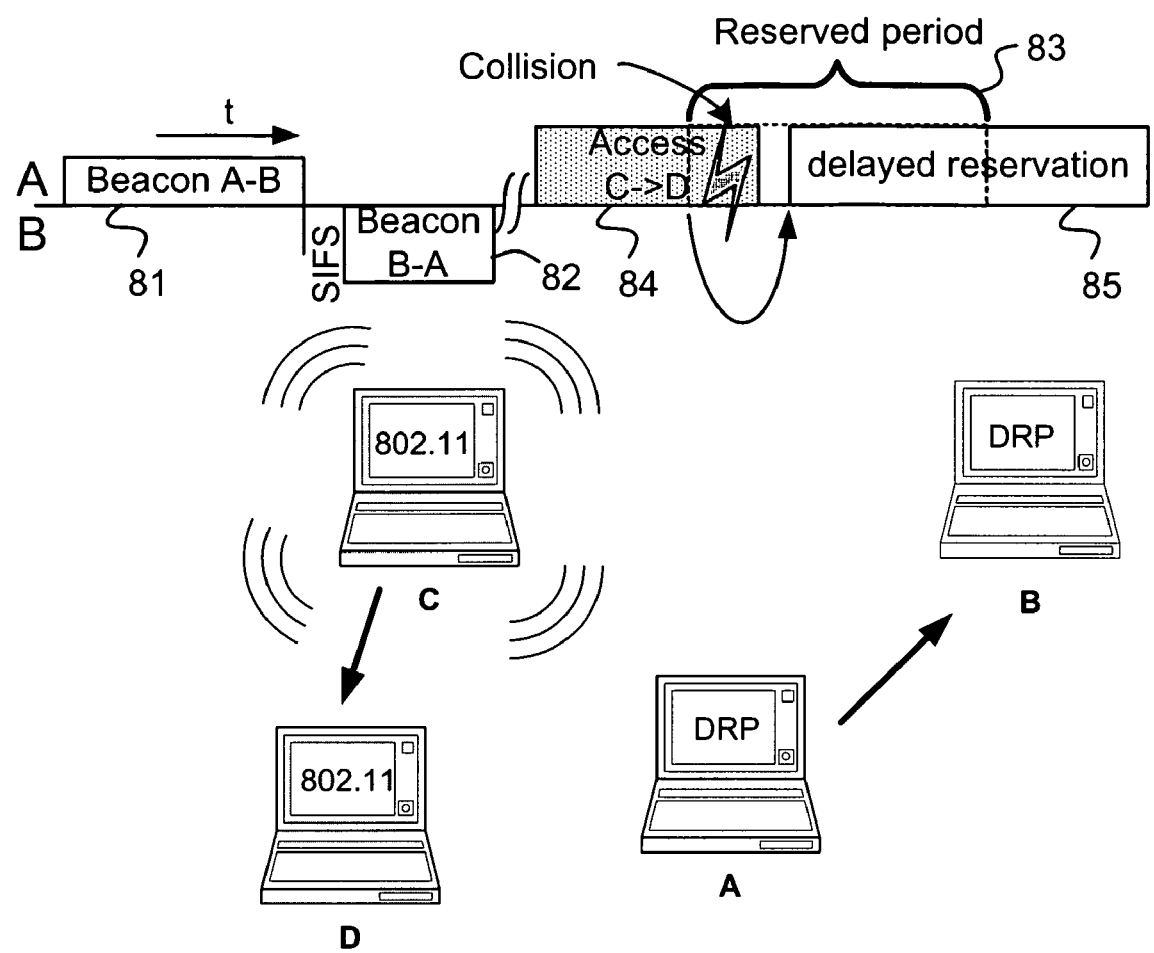
FIG. 8 shows a situation according to the prior art, wherein station C access the medium without respecting the reserved period for transmission between station A and B.

FIG. 8 illustrates a scenario according to the prior art. There are two DRP stations A and B and two legacy station C and D. The stations A and B operate according to the DRP protocol. The stations C and D operate according to the 802.11 standard protocol without the ability to recognize beacons for distributed reservation periods. The DRP stations A and B negotiate a reserved period 83 by sending a source beacon 81 from A to B. Station B retransmits a destination beacon 82 back to the source station a, to avoid the problem of hidden stations. Since the legacy stations C and D do not understand or recognize the content of a beacon they are not informed about the reservation period 83 for data transmission between A and B. It is illustrated that station C starts to access the medium by sending a frame 84 to station D. However the frame 84 overlaps with the reserved period 83. So a collision during data transmission occurs between data stream from C to D and data stream from A to B. This results in a back off period for all participating stations. If a reservation table in the station A allows a delayed transmission one option for the station might be to start its reservation delayed. In a busy channel environment that will hardly be possible. Then station A may transmit its data stream at a delayed reservation period 85, wherein it is not secured whether a delayed transmission could be performed successfully, since station C or any other legacy station may send at this delayed reservation period again. Prolonging or delaying of scheduled reservations is a possible solution but does not provide for satisfactory performance results. A delayed transmission of a reservation slot will also delay subsequent reservations. Thus the scheduling of all reservations is disturbed leading to a high probability of reservation collisions.

By applying the inventive system or method it is possible to avoid such disturbance by legacy stations, since the CFP signaling included a beacon indicates to legacy stations to stop any accesses to the medium during the time which is given by the CFP period.

The invention may be summarized by a radio communications network consisting of several stations wherein some stations use the IEEE 802.11 protocol and other stations a new, downwards compatible protocol (DRP). In order to perform a future transmission the medium has to be reserved by a station on its own as the network has a decentralized structure. This new protocol (DRP) sends the reservation request as part of a beacon. Since the beacon is a signal that is broadcasted to every active station it is overheard by every station and respected.

If a new connection is about to be initiated the source station starts the negotiation with a beacon. If the connection is already set up the reservation request is part of a data frame and the destination station is the first to send a beacon.

The invention claimed is:

1. Method for reservation of a medium in a radio communication network for data transmission between stations of the network comprising at least one station operating according to a first protocol and a different second station operating according to a different second protocol, the method comprises the steps of:
    providing a contention free period within the first and second protocol by means of a common part of the same beacon signal;
    performing the reservation of the medium for the first station according to the first protocol;
    and performing the reservation of the medium for the second station according to the second protocol,
    announcing the contention free period to said at least one station operating according to tire first protocol and to said different second station operating according to tire different second protocol by broadcasting a single beacon signal.

2. The method according to claim 1, further comprising:
    overhearing the signal by the first and second stations;
    respecting an overheard signal in each of the first and second stations;
    announcing the contention free period (CEP) for reservation of the medium by the same beacon signal comprising a reservation signal according to the second protocol and as reservation information according to the first protocol.

3. The method according to claim 2, further comprising: stations which receive one of the source or destination beacon, sending a beacon in which the Contention Free Period (CFP) is included.

4. The method according to claim 2, wherein the stations other than the source or the destination station, which receive any reservation request in any beacon store the information concerning the Contention Free Period (CFP) as reservation request information and defer from accessing the medium during the contention free period (CFP).

5. The method according to claim 1, further comprising:
    announcing the contention free period (CEP) of the medium for reserving a future transmission by broadcasting the same beacon signal comprising information for reservation of the medium which is recognized by the first station and comprising further a contention free period (CFP) signal, which is known by the second station.

6. The method according to claim 5, wherein the reservation information is included in the beacons of sender stations and receiver stations of the planned transmission as well as in beacons of other neighbouring stations of the sender stations and the receiver stations, for those neighboring stations which have received the reservation information in the beacons of the sender stations and the receiver stations.

7. The method according to claim 1, further comprising:
    a source station sending a source beacon to a destination station and
    at least one destination station acknowledging the receipt of the source beacon by sending a destination beacon.

8. The method according to claim 1, further comprising:
    the destination station—sending a destination beacon to the source station and
    the source station acknowledging the receipt of the destination beacon by sending a source beacon.

9. The method according to claim 8, wherein subsequent establishing a connection between the source station and the destination station, the method further comprising:
    the source station sending as part of a data frame of a present transmission a reservation request for a future transmission to the destination station and future intended destination station;
    the destination station sending a beacon repeating the reservation request to announce a Contention Free Period;
    active stations in the transmission range of the intended destination station overhearing the beacon and locally storing the Contention Free Period, respectively reservation information and
    the source station interpreting the beacon as an acknowledgement of save receipt of the data frame just sent;
    the source station repeating the beacon.

10. The method according to claim 9, wherein active stations both in the transmission range of the source station and the destination station overhear the source and/or destination beacon and respect the contention free period (CEP) identified by, reservation information in the beacon.

11. The method according to claim 9, wherein the stations other than the source or the destination station, which receive any reservation request in any beacon store the reservation request information concerning the Contention Free Period (CFP), and defer from accessing the medium during the reserved period (CFP).

12. The method according to claim 9, wherein a passive station that becomes active first listens for a beacon in the medium before sending a beacon, wherein the station listens on the medium for a determined period.

13. The method according hr claim 9, wherein the beacon includes one of a Frame Control field or a Frame Body field comprising the reservation request.

14. The method according to claim 9, wherein the beacon including the Contention Free Period (CFP) is according to the IEEE 802.11 standard and extension standards.

15. The method according to claim 9, wherein the beacon comprises information regarding one of:
   the priority of the planned transmission,
   the frequency or code channel of the planned transmission,
   the starting point and duration of the reservation,
   routing information,
   the times during which the sender of the beacon or neighboring stations will be in sleep or active or hibernating mode,
   wherein the sleep or active times are announced with their starting time, duration and eventually periodicity or in form of a bitmap, where one or several bits signal the state of the station in a certain time slot.

16. The method according to claim 9, characterized in that the beacon comprises a bitmap, which signals the occupancy of time slots within a superframe and in which one or several bits are included per time slot.

17. The method according to claim 1, wherein a passive station that becomes active first listens for a beacon in the medium for a determined period before sending a beacon.

18. The method according to claim 1, wherein the beacon includes one of a Frame Control field or a Frame Body field comprising the reservation request.

19. The method according to claim 1, wherein the beacon including the Contention Free Period (CEP) is in conformance with the IEEE 802.11 standard and extension standards.

20. The method according to claim 1, wherein the beacon comprises information including one of:
   the priority of the planned transmission,
   the frequency or code channel of the planned transmission,
   the starting point and duration of the reservation,
   routing information,
   the times during which the sender of the beacon or neighboring stations will be in sleep time or active time or hibernating mode,
   wherein the sleep time or active time is announced with their starting time, duration and eventually periodicity or in form of a bitmap, and
   where one or several bits signal the state of the station in a certain time slot.

21. The method according to claim 1, wherein the beacon comprises a bitmap, which signals the occupancy of time slots within a superframe and in which one or several bits are included per time slot.

22. The method according to claim 1, wherein the radio communication network is a wireless local area network WLAN and wherein the protocol is in accordance with IEEE802.11 standard and extension standards.

23. A communication device operating in accordance with the method of claim 1.

24. Radio communication network having a medium for data transmission between stations of a network comprising at least one station operating according to a first protocol and a different second station operating according to a different second protocol, a contention free period is provided within the first and second protocol by means of a common part of the same beacon element,
   wherein during the contention free period the access to the medium for the first station is defined according to the first protocol and the access to the medium for the second station is defined according to the second protocol, wherein the reservation of the medium is signaled by broadcasting a single beacon signal comprising a reservation signal (CFP) according to the first protocol and the second protocol.

25. The radio communication network according to claim 24 further comprising a plurality of stations including said at least one station operating according to said first protocol and said at least one station operating according to said second protocol, wherein at least two stations from among said plurality of stations use a protocol that prescribes that a beacon signal, which is overheard, has to be respected by every active station, wherein at least one station announces a contention free period (CFP) as a means for reserving a future transmission, by broadcasting a beacon that comprises the Contention Free Period (CFP) signal according to the second protocol.

26. The method according to claim 24, wherein the radio communication network is WLAN and wherein the protocol is in accordance with IEEE802.11 and extensions standards.

27. A non-transitory computer medium that includes a program that, when executed by a processor, causes the processor to implement a radio communication network having a medium for data transmission between stations as claimed in claim 24.

28. A non-transitory computer medium that includes a program that, when executed by a processor, causes the processor to:
   provide a contention free period within the first and second protocol by means of a common part of the same beacon element,
   perform the reservation of the medium for the first station according to the first protocol; and
   perform the reservation of the medium for the second station according to the second protocol,
   announcing the contention free period to said at least one station operating according to the first protocol and to said different second station operating according to the different second protocol by broadcasting a single beacon signal.

29. A method of distributive reservation of a medium consisting of several stations wherein at least two stations of said several stations use a protocol that prescribes that a beacon signal, which is overheard, has to be respected and wherein at least a single station announces a Contention Free Period as a means for reserving a future transmission to said at least one station of said several stations operating according to a first protocol and to a different second station operating according to a different second protocol.

30. The method according to claim 29, further comprising:
   the source station sending a source beacon to at least one destination station; and
   the at least one destination station acknowledging the receipt of the source beacon by sending a destination beacon.

31. The method according to claim 30 further comprising:
   sending a destination beacon from the destination station to the source station, and
   the source station acknowledging the receipt of the destination beacon by sending a source beacon.

32. The method according to claim 30, wherein active stations both in the transmission range of the source station and in the transmission range of the destination station overhear the source and/or destination beacon and respect reservation information identified in the Contention Free Period (CFP), in the beacon.

33. The method of claim 30, further comprising for those stations which receive the source and/or destination beacon, said stations sending a response beacon which includes the reservation request received from the source and/or destination station.

34. The method according to claim 30, wherein the stations other than the source or the destination station, which receive any reservation request in any beacon store the information concerning the Contention Free Period and defer from accessing the medium during the Contention Free Period.

35. The method according to claim 30, wherein the reservation information is included in the beacons of sender and receiver(s) of the planned transmission as well as in beacons of other neighboring stations of the sender and the receivers, which neighboring stations have received the reservation information in the beacons of sender and receiver(s).

36. The method according to claim 29, wherein subsequent to a connection being made between source station and destination station, performing further steps of:
the source station sending as part of a data frame of a present transmission a reservation request for a future transmission to the present and intended destination station;
the destination station sending a beacon repeating the reservation request and so announcing a Contention Free Period;
active stations in the transmission range of the intended destination station overhearing the beacon and locally storing the Contention Free Period, respectively reservation information and the source station interpreting the beacon as an acknowledgement of save receipt of the data frame just sent.

37. The method according to claim 36, further comprising the source station repeating the beacon and active stations other than the intended destination station overhearing the beacon, and
locally storing the reservation information included in the Contention Free Period, and
deferring from medium access during the reserved period.

38. The method according to claim 29, wherein a passive station that becomes active first listens for a beacon in the medium before sending a beacon.

39. The method according to claim 38, wherein the station listens on the medium for a determined period.

40. The method according to claim 29, wherein the beacon consists of several fields and that a Frame Control field and/or Frame Body field comprises the reservation request.

41. The method according to claim 29, wherein the beacon including the Contention Free Period is in conformance with the IEEE 802.11 and extension standards.

42. The method according to claim 29, wherein the beacon comprises information regarding the priority of the planned transmission.

43. The method according to claim 29, wherein the beacon comprises information regarding the frequency or code channel of the planned transmission.

44. The method according to claim 29, wherein the beacon comprises information regarding the starting point and duration of the reservation.

45. The method according to claim 29, wherein the beacon comprises a bitmap, which signals the occupancy of time slots within a superframe-like time period and in which one or several bits are included per time slot.

46. The method according t claim 29, wherein the beacon comprises information regarding the times during which the sender of the beacon will be in sleep or active or hibernating mode.

47. The method according to claim 46, wherein said sleep or active times are announced with their starting time, duration and eventually periodicity.

48. The method according to claim 46, wherein said sleep or active times are announced in form of a bitmap, where one or several bits signal the state of the station in a certain time slot.

49. The method of claim 29, wherein the beacon comprises information regarding the times during which neighboring stations will be in sleep or active or hibernating mode.

50. A radio communications network consisting of a plurality of stations, wherein at least two stations from among said plurality of stations use a protocol that prescribes that a beacon signal, which is overheard, has to be respected, wherein at least one station from among said plurality of stations operates according to a first protocol and at least one other station from among said plurality of stations operates according to a different second protocol, wherein at least a single station broadcasts a single beacon to the at least two stations announcing a contention free period to the at least two stations as a means for reserving a future transmission, the radio network comprising:
a source station broadcasting said single beacon with a reservation request for a future transmission in the contention free period thereby announcing the contention free period to at least one station operating according to the first protocol and to at least one other station operating according to the different second protocol,
destination stations within communicable range of the source station acknowledging receipt of the beacon sent by the source station by sending a destination beacon,
the source station acknowledging the receipt of the destination beacon by sending a source beacon.

51. A radio communications network according to claim 50, wherein in the case where a connection between source station and destination station has been established, the method further comprising steps of:
the source station sending as part of a data frame of a present transmission a reservation request for a future transmission to the present and intended destination station;
the destination station sending a single beacon repeating the reservation request and announcing a Contention Free Period;
active stations in the transmission range of the intended destination station overhearing the beacon and store reservation information locally and
the source station interpreting the beacon as an acknowledgement of save receipt of the data frame just sent.

52. A radio communications network according to claim 51, further comprising
the source station repeating the beacon, and
active stations other than the intended destination station overhearing the beacon, locally storing-reservation information and deferring from medium access during the reserved period.

53. A radio communications network according to claim 51, in which active stations both in the transmission range of the source station and/or in the transmission range of the destination station overhear the source and/or destination beacon and respect the CFP, respectively reservation information in the beacon.

54. A radio communications network according to claim 51, in which stations, which received the source and/or destination beacon, send an own beacon, in which the Contention Free Period, respectively reservation request from source or destination beacon is included.

55. A radio communications network according to claim 51, in which stations other than the source or the destination, which receive a reservation request in any beacon defer from accessing the medium during the reserved period (CFP).

56. A radio communications network according to claim 51, in which a passive station that becomes active first listens for a beacon in the medium before sending a beacon.

57. A radio communications network according to claim 56, in which the station listens on the medium for a determined period.

58. A radio communications network according to claim 50, in which the beacon consists of several fields and that a Frame Control field and/or Frame Body field comprises the reservation request.

59. A radio communications network according to claim 50, in which the beacon comprising the Contention Free Period is in compliance with the IEEE 802.11 standard and extension standards.

60. A radio communications network according to claim 50, in which the beacon comprises information regarding the priority of the planned transmission.

61. A radio communications network according to claim 50, in which the beacon comprises information regarding the frequency or code channel of the planned transmission.

62. A radio communications network according to claim 50, in which the beacon comprises information regarding the starting point and duration of the reservation.

63. A radio communications network according to claim 50, in which the beacon comprises a bitmap, which signals the occupancy of time slots within a superframe-like time period and in which one or several bits are included per time slot.

64. A radio communications network according to claim 50, in which the beacon comprises information regarding the times during which the sender of the beacon will be in sleep or active or hibernating mode.

65. A radio communications network according to claim 64, in which said sleep or active times are announced with their starting time, duration and eventually periodicity.

66. A radio communications network according to claim 64, in which said sleep or active times are announced in form of a bitmap, where one or several bits signal the state of the station in a certain time slot.

* * * * *